(12) United States Patent
Suematsu et al.

(10) Patent No.: US 6,623,175 B2
(45) Date of Patent: Sep. 23, 2003

(54) OPTICAL CONNECTOR FERRULE

(75) Inventors: Katsuki Suematsu, Tokyo (JP); Hiroyuki Yamada, Tokyo (JP); Kenji Suzuki, Tokyo (JP); Takeo Shimizu, Tokyo (JP); Hiroshi Matsuura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/018,000

(22) Filed: Dec. 13, 2001

(65) Prior Publication Data

US 2003/0031425 A1 Feb. 13, 2003

(30) Foreign Application Priority Data

Jul. 9, 2001 (JP) ........................ 2001-208230

(51) Int. Cl.[7] ................................ G02B 6/36
(52) U.S. Cl. ........................................ 385/78
(58) Field of Search ................ 385/78, 88, 93, 385/147

(56) References Cited

U.S. PATENT DOCUMENTS 6,499,887 B2 * 12/2002 Dean, Jr. et al. .............. 385/78

* cited by examiner

*Primary Examiner*—Javaid H. Nasri
(74) *Attorney, Agent, or Firm*—Knobbe, Marten, Olson & Bear LLP (57) ABSTRACT

An optical connector ferrule is equipped with a fiber insertion hole composed of an introductory hole, an intermediate hole, and minute holes. The introductory hole has a sectional area, which allows insertion of the coated portions of optical fibers. The intermediate hole has a sectional area which does not allow insertion of the coated portions of the optical fibers but which allows insertion of bare fibers exposed in front of the coated portions. Each of the minute holes has a sectional area, which allows individual insertion of each of the forward end portions of the bare fibers inserted into the intermediate hole. Thus, the insertion length of the optical fibers in the fiber insertion hole is uniquely determined. In particular, the insertion length of the coated portions can be set a predetermined length easily and reliably.

7 Claims, 10 Drawing Sheets

OPTICAL CONNECTOR FERRULE

BACKGROUND OF THE INVENTION

1. Field of the Invention

The present invention relates to an optical connector ferrule.

2. Description of the Related Art

Figure 13:
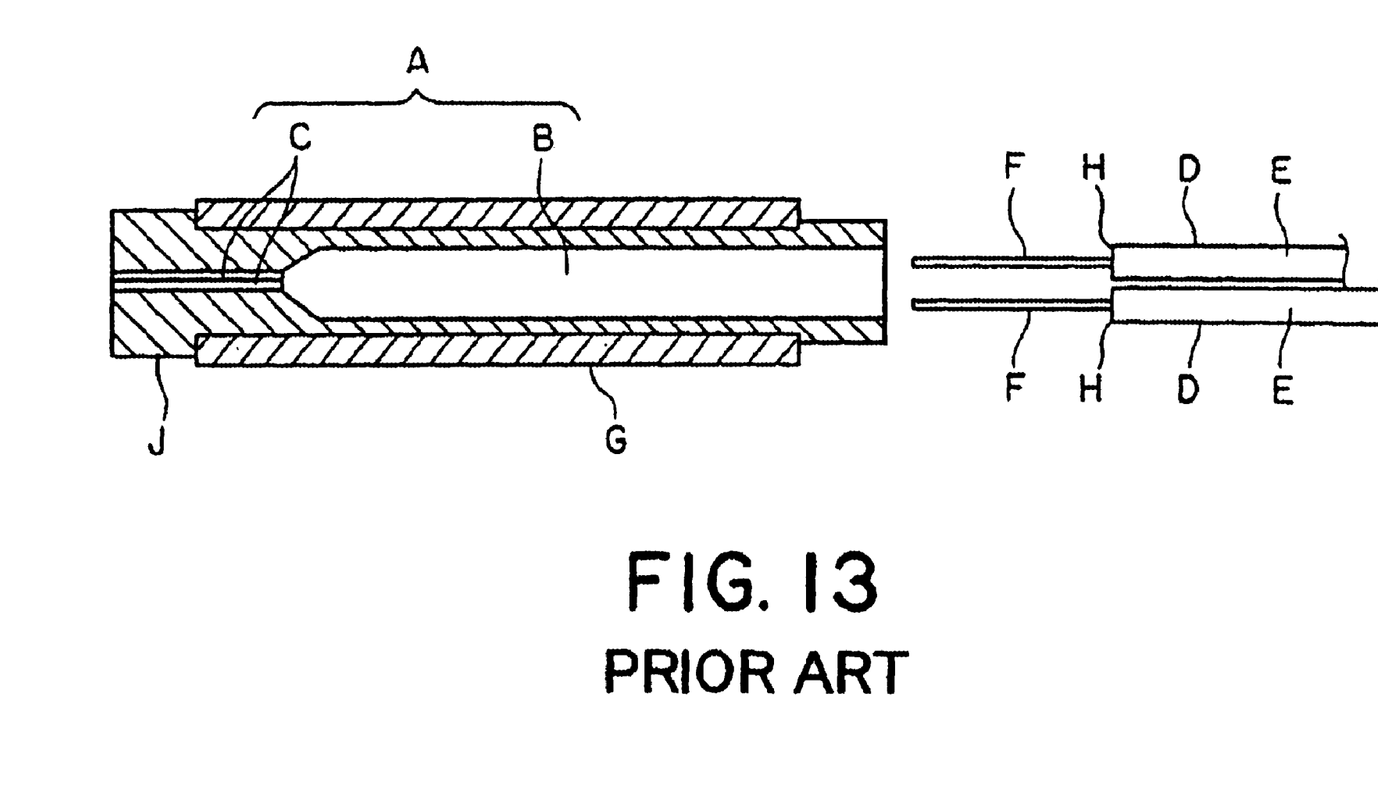
FIG. 13 is a sectional view showing an example of a conventional optical connector ferrule.

FIG. 13 shows an example of a conventional optical connector ferrule. This ferrule is composed of a cylindrical molded-plastic member J and a cylindrical metallic sleeve G fitted onto it. At the center of the molded-plastic member J, there is formed a fiber insertion hole A piercing from one end surface to the other thereof. The fiber insertion hole A includes an introductory hole B and two minute holes C. The sectional area of the introductory hole B is large enough to allow a plurality of (two, in FIG. 13) optical fibers D arranged in parallel to be simultaneously inserted therein. Each minute hole C has a sectional area that allows individual insertion of each of bare fibers F obtained by removing coating E from the forward end portions of the plurality of optical fibers D inserted into the introductory hole B.

SUMMARY OF THE INVENTION

An optical connector ferrule according to the present invention includes a fiber insertion hole piercing from one end surface to the other end surface in a longitudinal direction thereof, and has the following structures.

The fiber insertion hole is composed of an introductory hole, an intermediate hole, and a plurality of minute holes;

the introductory hole is formed on one end side in the longitudinal direction of the optical connector ferrule;

the intermediate hole is formed in front of the introductory hole;

the minute holes are formed in front of the intermediate hole;

the introductory hole has a sectional area that allows insertion of a coated portion of an optical fiber;

the intermediate hole has a sectional area which does not allow insertion of the coated portion of the optical fiber but which allows insertion of a bare fiber exposed at the forward end of the coated portion; and the minute holes have a sectional area that allows insertion of the forward end portion of the bare fiber inserted into the intermediate hole.

An optical connector ferrule according to the present invention includes a fiber insertion hole piercing from one end surface to the other end surface in a longitudinal direction thereof, and has the following structures.

The fiber insertion hole is composed of an introductory hole, an intermediate hole, and a plurality of minute holes;

the introductory hole is formed on one end side in the longitudinal direction of the optical connector ferrule;

the intermediate hole is formed in front of the introductory hole;

the minute holes are formed in front of the intermediate hole;

the introductory hole has a sectional area that allows simultaneous insertion of the coated portions of a plurality of optical fibers;

the intermediate hole has a sectional area which does not allow simultaneous insertion of the coated portions of a plurality of optical fibers but which allows simultaneous insertion of bare fibers exposed at the forward end of the coated portions; and each of the minute holes has a sectional area that allows individual insertion of each of the forward end portions of the bare fibers inserted into the intermediate hole.

The optical connector ferrule of the present invention includes an optical connector ferrule in which the sectional area of the intermediate hole varies stepwise.

The optical connector ferrule of the present invention includes an optical connector ferrule in which the sectional area of the introductory hole and the sectional area of the intermediate hole are gradually diminished from the inlet side of the introductory hole toward the outlet side of the intermediate hole.

The optical connector ferrule of the present invention includes an optical connector ferrule in which the length of the introductory hole is not less than eight times the diameter of the coated portion of the optical fiber.

The optical connector ferrule of the present invention includes an optical connector ferrule in which the minute holes are arranged in a row at a predetermined pitch or on the same circumference at a predetermined pitch.

The optical connector ferrule of the present invention includes an optical connector ferrule in which the intermediate hole has a length which does not involve bending of the optical fibers in the intermediate hole by a bending radius of not more than 10 mm when the forward ends of the optical fibers are inserted into the minute holes.

The optical connector ferrule of the present invention includes an optical connector ferrule in which the minute holes are arranged in a row at a predetermined pitch, and wherein minute holes are arranged in a row at a predetermined pitch, and a sectional configuration of said introductory hole allows simultaneous insertion of the coated portions of a plurality of optical fibers arranged in a direction in which the minute holes are arranged and stacked in two or more stages.

DETAILED DESCRIPTION (Embodiment 1)

Figure 1A:
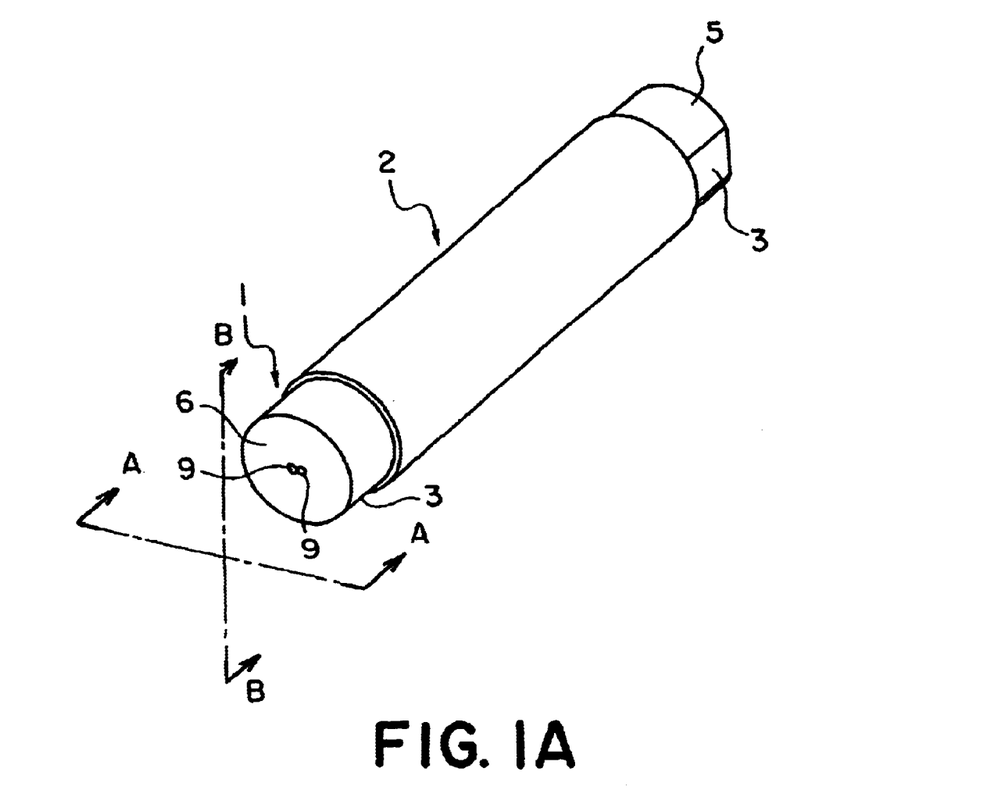
FIG. 1A is a perspective view showing an example of an optical connector ferrule according to the present invention.
Figure 1B:
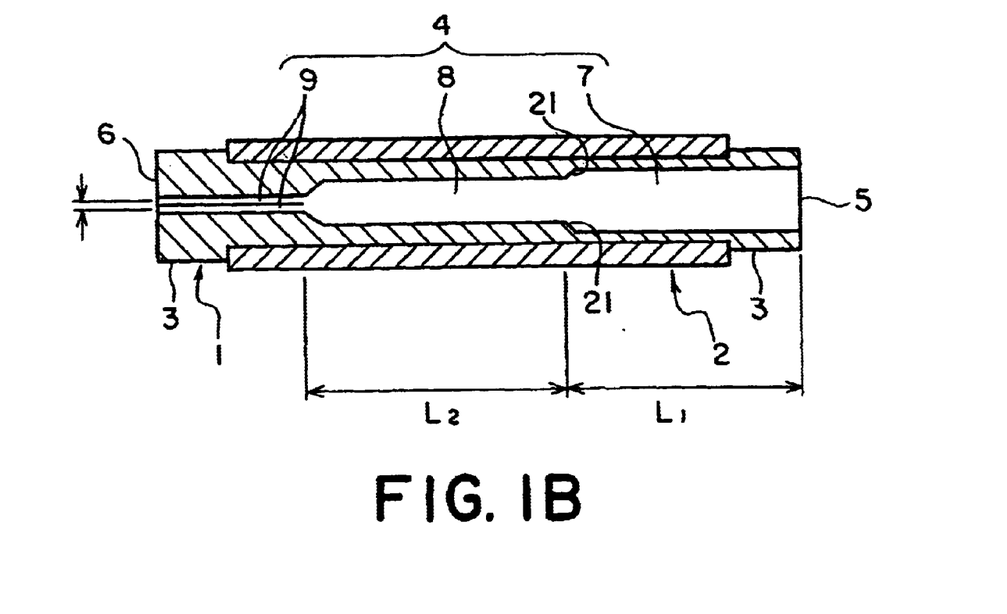
FIG. 1B is a sectional view taken along the line A—A of the optical connector ferrule shown in FIG. 1A.
Figure 2:
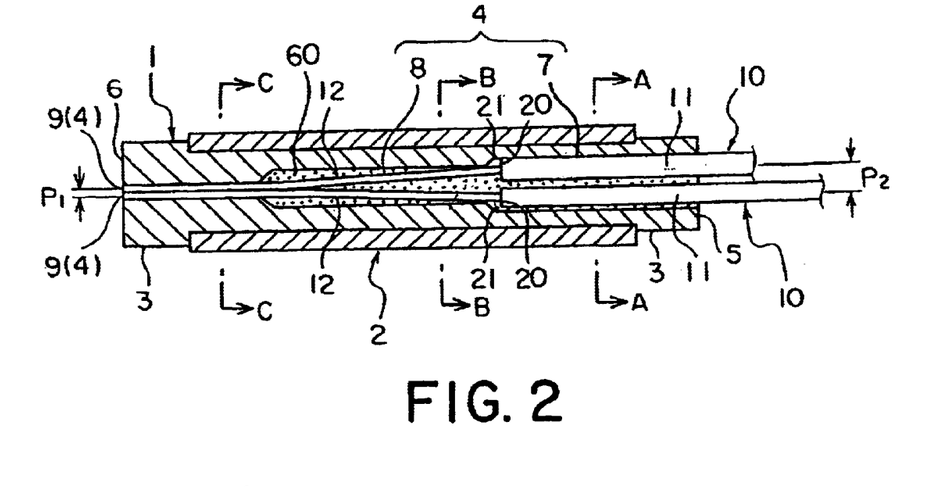
FIG. 2 is a sectional view showing a state in which an optical fiber is fixed to the optical connector ferrule shown in FIG. 1A.
Figure 3A:
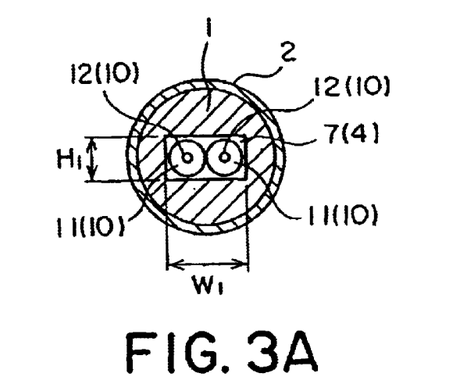
FIG. 3A is a sectional view taken along the line A—A of the optical connector ferrule shown in FIG. 2.
Figure 3B:
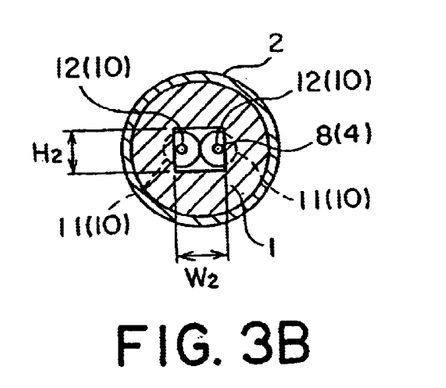
FIG. 3B is a sectional view taken along the line B—B of the optical connector ferrule shown in FIG. 2.
Figure 3C:
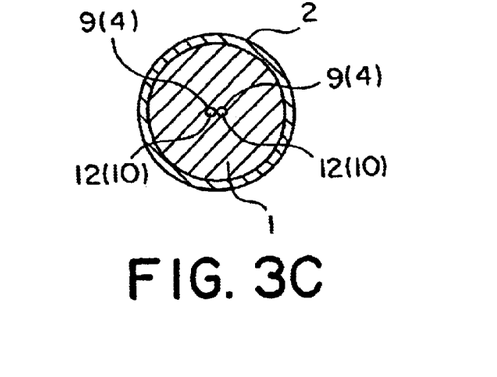
FIG. 3C is a sectional view taken along the line C—C of the optical connector ferrule shown in FIG. 2.

An example of the optical connector ferrule of the present invention will be described herein below. FIG. 1A is a perspective view of an optical connector ferrule according to Embodiment 1 of the present invention. FIG. 1B is a sectional view taken along the line A—A of FIG. 1A. FIG. 2 is a sectional view showing a state in which an optical fiber is fixed to the optical connector ferrule by adhesive 60 shown in FIGS. 1A and 1B. FIG. 3A is a sectional view taken along the line A—A of FIG. 2. FIG. 3B is a sectional view taken along the line B—B of FIG. 2. FIG. 3C is a sectional view taken along the line C—C of FIG. 2. As shown in FIGS. 1A and 1B, the optical connector ferrule of this embodiment is formed by fitting a cylindrical metallic sleeve 2 onto a cylindrical molded-plastic member 1. At the longitudinal ends of the molded-plastic member 1, there are formed flanges 3 protruding outwardly in the radial direction of the molded-plastic member 1. The metallic sleeve 2 is fitted onto the portion between the two flanges 3.

As shown in FIG. 1B, at the center of the molded-plastic member 1, there is formed a fiber insertion hole 4 piercing from one end surface 5 to the other end surface 6 (ferrule end face 6). The fiber insertion hole 4 includes an introductory hole 7 formed on the end surface 5 side of the molded-plastic member 1, an intermediate hole 8 formed in front of the introductory hole 7, and two minute holes 9 formed in front of the intermediate hole 8. That is, the introductory hole 7 formed on the end surface 5 side of the molded-plastic member 1 and the two minute holes 9 formed on the ferrule end face 6 side communicate with each other through the intermediate hole 8. An optical fiber from which the forward end portions of the external coating and the optical fiber element coating have been removed by a predetermined length to partially expose an inner bare fiber is inserted into the fiber insertion hole 4 and secured therein.

As shown in FIGS. 2 and 3A, the introductory hole 7 is a rectangular hole of a height ($H_1$) and a width ($W_1$) allowing simultaneous insertion of the coated portions 11 of two optical fibers 10 arranged in parallel. As shown in FIGS. 2 and 3B, the intermediate hole 8 is a rectangular hole of a height ($H_2$) which is the same as the height ($H_1$) of the introductory hole 7 and of a width ($W_2$) which is shorter than the width ($W_1$) of the introductory hole 7. The width ($W_2$) of the intermediate hole 8 is less than double the diameter of the coated portion 11. As shown in FIGS. 2 and 3C, the minute holes 9 are round holes having an inner diameter slightly larger than the diameter of the bare fibers 12. Thus, the sectional areas of the introductory hole 7, the intermediate hole 8, and the minute holes 9 are diminished stepwise.

Thus, when the two optical fibers 10 arranged in parallel are inserted into the fiber insertion hole 4, the forward end surfaces 20 of the coated portions 11 of the optical fibers 10 (i.e., the pared sides 20 left after removing the coating to expose the bare fibers 12) abut the inlet peripheral edge 21 of the intermediate hole 8. As a result, the two optical fibers 10 cannot be further inserted into the fiber insertion holes 4, thus uniquely determining the insertion length of the coated portions 11. That is, the length $L_1$ of the introductory hole 7 (FIG. 1B) corresponds to the insertion length of the coated portions 11 in the optical connector ferrule.

If the insertion length of the coated portions 11 is not appropriate, the following problems are involved.

Figure 4A:
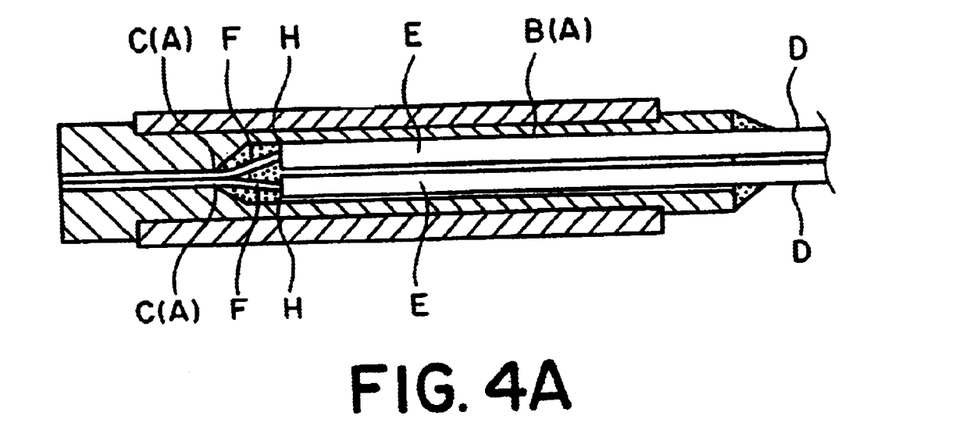
FIG. 4A is a sectional view showing a case in which the insertion length of the coated portions is too large.

(1) FIG. 4A shows a case in which the insertion length of the coated portions is too large. The fiber insertion hole A of the optical connector ferrule shown in FIG. 4A includes an introductory hole B allowing simultaneous insertion of coated portions E of two optical fibers D arranged in parallel, and minute holes C into which bare fibers F exposed at the forward end of the optical fibers D inserted into the introductory hole B are individually inserted. As shown in FIG. 4A, when the insertion length of the coated portions E is too large, the distance from the pared sides H of the coated portions of the optical fibers D to the minute holes C is rather small. Thus, the bare fibers F are bent abruptly, so that fiber breakage is likely to occur. In particular, when there is a marked variation in ambient temperature, the adhesive with which the interior of the optical connector ferrule is filled shrinks or expands, and, due to the stress thereby generated, fiber breakage is more likely to occur.

Figure 4B:
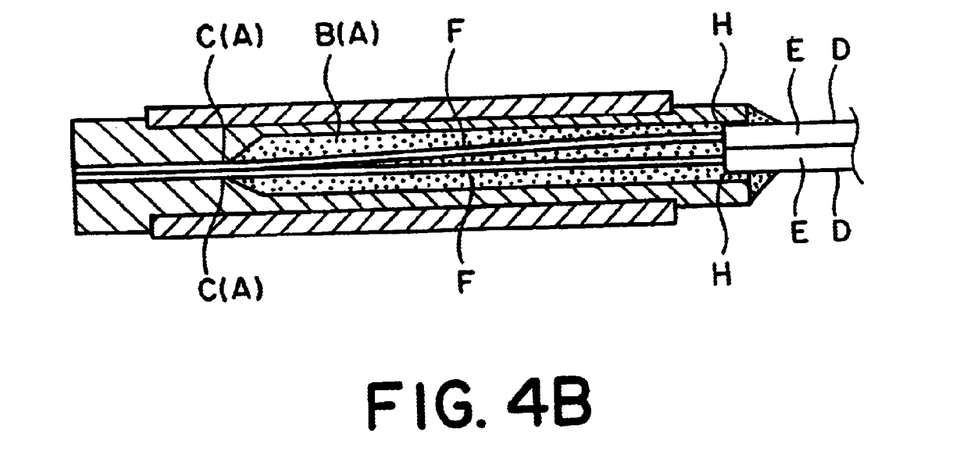
FIG. 4B is a sectional view showing a case in which the insertion length of the coated portions is too short.

(2) FIG. 4B shows a case in which the insertion length of the coated portions is too short. The optical connector ferrule shown in FIG. 4B is the same as the one shown in FIG. 4A. When the insertion length of the coated portions E is too short, fiber breakage is likely to occur when a bending force is applied to the optical fibers D in the vicinity of the inlet of the fiber insertion hole A (introductory hole B).

To solve the above problem (2), it is desirable that the insertion length of the coated portions E shown in FIGS. 4A and 4B be not less than eight times the diameter of the coated portions E.

In view of this, in the optical connector ferrule of this embodiment, the length $L_1$ of the introductory hole 7 shown in FIG. 1B is not less than eight times the diameter of the coated portions 11 of the optical fibers 10. For example, when the optical fibers 10 are ordinary optical fibers, the diameter of the coated portions 11 is approximately 0.25 mm. Thus, when the length $L_1$ of the introductory hole 7 is not less than 2 mm (0.25 mm×8=2 mm), it is possible to easily and reliably ensure an insertion length of not less than eight times the diameter of the coated portions 11. In the optical connector ferrule of this embodiment, the safety value is 1 mm, and $L_1$=3 mm.

Next, a means for solving the problem of the above (1) will be described.

The bare fibers 12 exposed at the forward end of the coated portions 11 inserted into the introductory hole 7 by 3 mm are inserted into the intermediate hole 8. The forward end portions of the bare fibers 12 inserted into the intermediate hole 8 are individually inserted into the two minute holes 9 formed in front of the intermediate hole 8. The two minute holes 9 are arranged at a pitch smaller than the pitch at which the two bare fibers 12 are arranged. Thus, when the forward end portions of the two bare fibers 12 are inserted into the minute holes 9, the bare fibers 12 are bent toward each other within the intermediate hole 8. The smaller the bending radius of the bare fibers 12, the greater the possibility of fiber breakage occurring. Thus, when the optical fibers 10 are ordinary optical fibers, it is desirable that the bending radius of the bare fibers 12 be not less than 20 mm. The bending radius (r) can be approximated by the following formula:

$$(r) \ (2L_2)^2/\{\pi^2(P_1-P_2)/2\}$$

where $P_1$ is the pitch (mm) of the bare fibers 12 individually inserted into the minute holes 9; $P_2$ is the pitch (mm) of the coated portions 11 arranged side by side inside the introductory hole 7; and $L_2$ is the length (mm) of the intermediate hole 8 (FIG. 1B).

Thus, to ensure a bending radius of not less than 20 mm, the length $L_2$ of the intermediate hole 8 is set such that r is not less than 20 mm. In the optical connector ferrule of this embodiment, the safety value is 10 mm, and $L_2$ is set such that r is not less than 30 mm. More specifically, when the optical fibers 10 are ordinary optical fibers, $P_1$ is 0.25 mm, and $P_2$ is 0.125 mm. By substituting these values into the above formula, the value of $L_2$ at which r=30 mm can be obtained as 3.04 mm. Thus, in the optical connector ferrule of this embodiment, $L_2$ is set to be 4 mm. When the optical fibers 10 are ones of high bending strength (e.g., screening fibers or carbon coat fibers), fiber breakage can be reliably prevented if a bending radius of not less than 10 mm is ensured. Thus, in this case, $L_2$ is set such that r is not less than 10 mm.

(Embodiment 2)

Figure 5A:
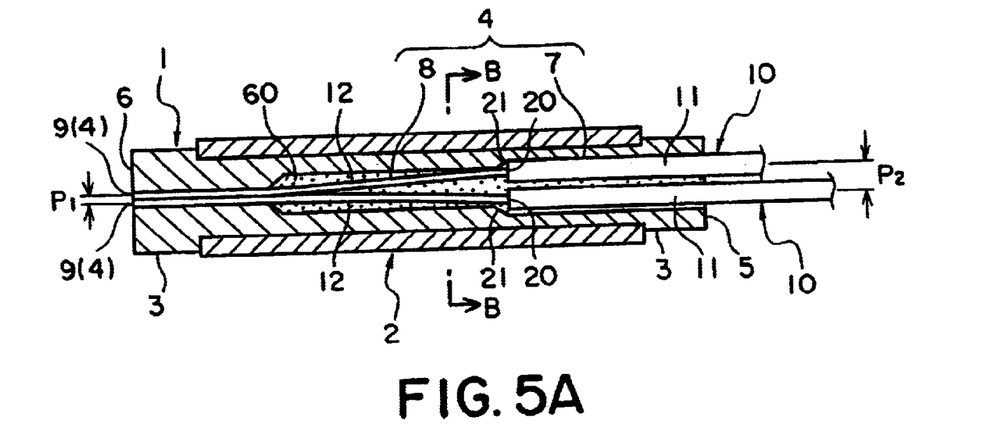
FIG. 5A is a sectional view showing another example of an optical connector ferrule according to the present invention.
Figure 5B:
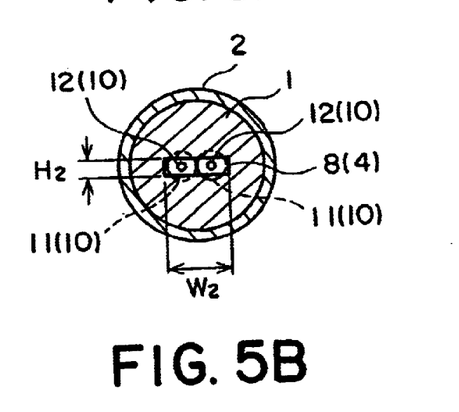
FIG. 5B is a sectional view taken along the line B—B of FIG. 5A.

An optical connector ferrule according to another embodiment of the present invention will now be described below. The basic construction of the optical connector ferrule of Embodiment 2 is the same as that of Embodiment 1. The difference lies in the sectional configuration of the intermediate hole. FIG. 5A is a sectional view of the optical connector ferrule of this embodiment. FIG. 5B is a sectional view taken along the line B—B of FIG. 5A.

As shown in FIG. 5B, the intermediate hole 8 of FIG. 5A is a rectangular hole whose height ($H_2$) is smaller than the diameter of the coated portions 11 of the optical fibers 10 and whose width ($W_2$) is the same as the width ($W_1$) of the introductory hole 7 shown in FIG. 3A.

Also in the case of the intermediate hole 8 shown in FIGS. 5A and 5B, the coated portions 11 of the two optical fibers 10 inserted into the introductory hole 7 are not inserted into the intermediate hole 8, thus uniquely determining the insertion length of the coated portions 11. In the case of the intermediate hole 8 shown in FIGS. 5A and 5B, the coated portions 11 of the optical fibers 10 are not allowed to be inserted into the intermediate hole 8 even when the optical fibers 10 are inserted one by one into the introductory hole 7.

Figure 6:
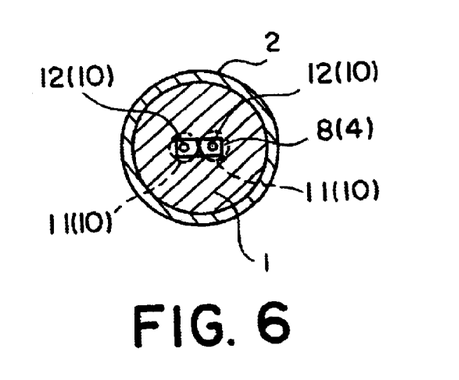
FIG. 6 is a sectional view showing another example of an intermediate hole.

FIG. 6 shows still another example of the intermediate hole 8. The intermediate hole 8 shown in FIG. 6 is a rectangular hole whose width ($W_2$) is the same as that of the intermediate hole 8 shown in FIG. 3B and whose height ($H_2$) is the same as that of the intermediate hole 8 shown in FIG. 5B. In the case of the intermediate hole 8 shown in FIG. 6, the coated portions 11 of the two optical fibers 10 inserted into the introductory hole 7 are not inserted into the intermediate hole 8, thus uniquely determining the insertion length of the coated portions 11. Further, even when the optical fibers 10 are inserted one by one into the introductory hole 7, the coated portions 11 of the optical fibers 10 are not inserted into the intermediate hole 8. Further, volume of this intermediate hole is smaller than that of the intermediate holes 8 shown in FIGS. 3B and 5B. Thus, the amount of adhesive with which the interior of the fiber insertion hole 4 is filled for the purpose of securing the optical fibers 10 in position is reduced. Since the amount of adhesive is relatively small, the optical fibers 10 and the ferrule undergo little deformation if the adhesive shrinks or expands as a result of changes in temperature, or the other factors. Thus, it is possible to restrain the fluctuations in the characteristics of the optical connectors to a minimum.

(Embodiment 3)

An optical connector ferrule according to still another embodiment of the present invention will now be described below with reference to FIGS. 7A through 7C. The basic construction of the optical connector ferrule of Embodiment 3 is the same as that of Embodiment 1. The difference lies in a structure allowing attachment of three optical fibers 10.

Figure 7A:
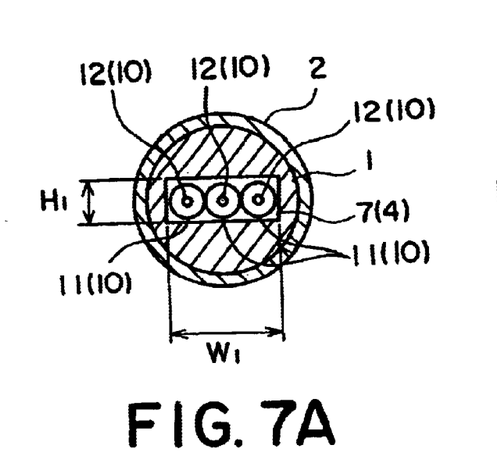
FIGS. 7A to 7C are sectional views showing another example of an optical connector ferrule according to the present invention.

As shown in FIG. 7A, the sectional configuration and sectional area of the introductory hole 7 are such that the coated portions 11 of three optical fibers 10 can be inserted therein in a condition in which the three optical fibers 10 are arranged in parallel. More specifically, the hole has a height ($H_1$) not smaller than the diameter of the coated portions 11 and a width ($W_1$) not smaller than three times the diameter of the coated portions 11 shown in FIG. 7A.

Figure 7B:
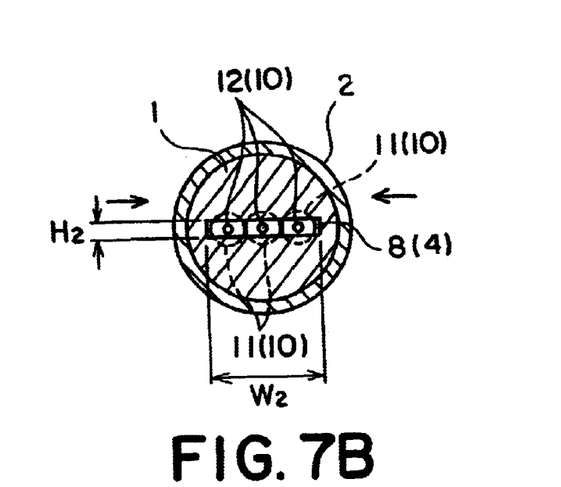
Figure 7C:
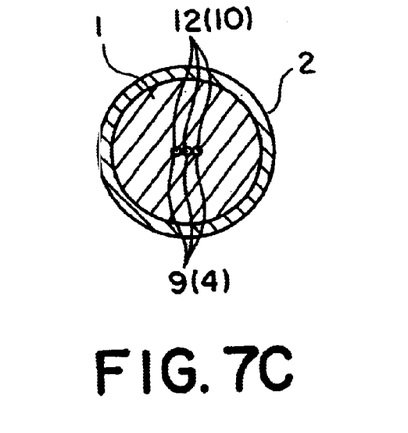

As shown in FIG. 7C, the intermediate hole 8 has a sectional configuration and a sectional area which do not allow insertion of the coated portions 11. More specifically, the hole has a height ($H_2$) smaller than the diameter of the coated portions 11 and a width ($W_2$), which is the same as the width ($W_1$) of the introductory hole 7.

As shown in FIG. 7B, three minute holes 9 are formed. The sectional configuration and sectional area (inner diameter) of each minute hole 9 are such that the forward end portions of the three bare fibers 12 inserted into the intermediate hole 8 can be individually inserted therein.

Thus, when the three bare fibers 12 inserted into the intermediate hole 8 are inserted into the respective minute holes 9, the outer two bare fibers 12 are shifted toward the central bare fiber 12 (i.e., shifted in the directions of arrows in FIG. 7C).

(Embodiment 4)

An optical connector ferrule according to a further embodiment of the present invention will be described with reference to FIGS. 8A through 8C. The basic construction of the optical connector ferrule of Embodiment 4 is the same as that of Embodiment 1. The difference lies in the sectional configuration of the fiber insertion hole 4.

Figure 8A:
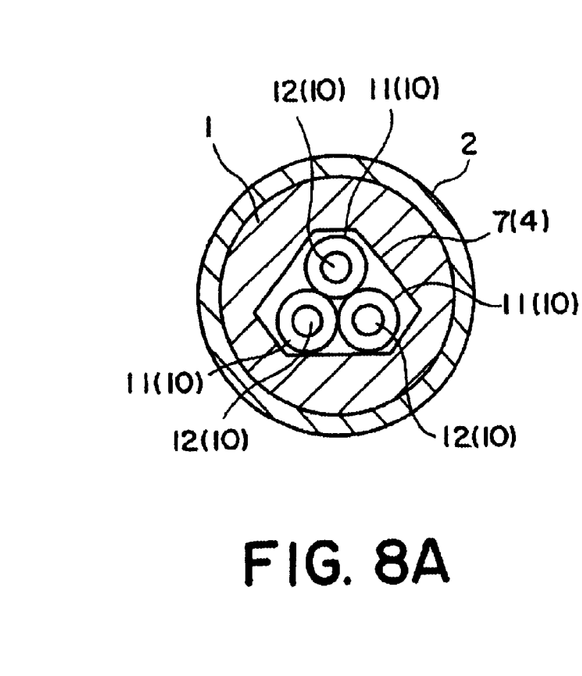
FIGS. 8A to 8C are sectional views showing another example of an optical connector ferrule according to the present invention.

As shown in FIG. 8A, the introductory hole 7 has a sectional configuration and a sectional area which allows simultaneous insertion of the coated portions 11 of three optical fibers 10 in a condition in which two optical fibers 10 are arranged in parallel and in which a third optical fiber 10 is superimposed thereon (i.e., in a bundled state).

Figure 8B:
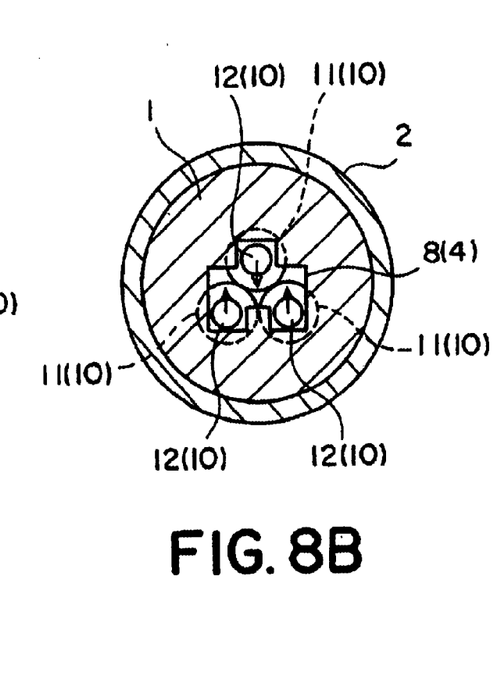

As shown in FIG. 8B, the intermediate hole 8 has a sectional configuration and sectional area which do not allow insertion of the coated portions 11 of the three optical fibers 10 bundled up as described above but which allows insertion of the bare fibers 12 in front of the coated portions 11.

Figure 8C:
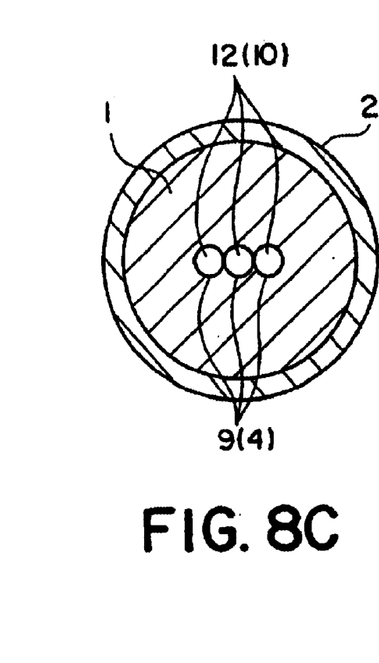

As shown in FIG. 8C, three minute holes 9 are formed in a lateral row. These three minute holes 9 are in close contact with each other or adjacent to each other at very small intervals.

Thus, when the three bare fibers 12 inserted into the intermediate hole 8 are inserted into the respective minute holes 9, the two outer bare fibers 12 are shifted upwards, and the central bare fiber 12 is shifted downwards, with the result that the three bare fibers are arranged in a lateral row.

There are two methods of inserting the three bare fibers into the three minute holes arranged in a lateral row. In one method, the three bare fibers 12 are, as shown in FIGS. 7A through 7C, arranged in a lateral row, with the two outer bare fibers 12 being shifted toward the center. In the other method, two bare fibers 12 are arranged side by side and a third bare fiber 12 is superimposed thereon, as shown in FIGS. 8A through 8C, and the lower bare fibers 12 are shifted upwards, the upper bare fiber 12 being shifted downwards. Of these two methods, the latter is more advantageous in that the bare fibers 12 undergo less bending at the time of insertion into the minute holes 9. The less the bending of the bare fibers 12, the less the influence of the changes as a result of shrinkage or expansion of the adhesive, thus ensuring satisfactory characteristics.

This also applies to the case in which four or more bare fibers are inserted into minute holes arranged in a lateral row. Thus, when inserting four bare fibers into four minute holes arranged in a lateral row, it is desirable for the sectional configuration of the fiber insertion hole to be as shown in FIGS. 9A through 9C.

Figure 9A:
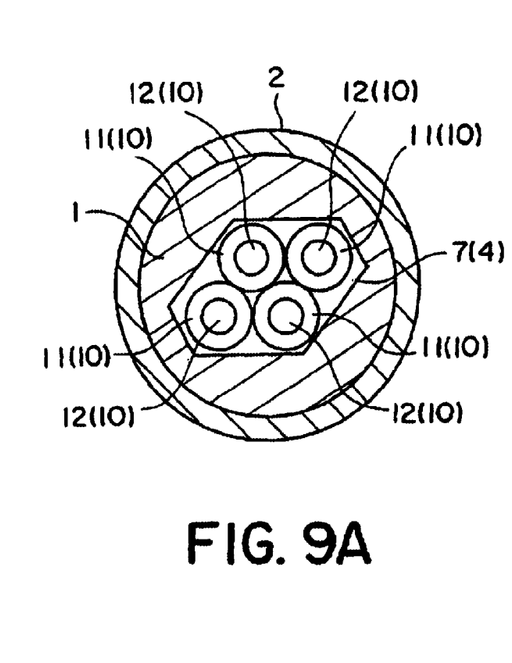
FIGS. 9A to 9C are sectional views showing another example of an optical connector ferrule according to the present invention.
Figure 9B:
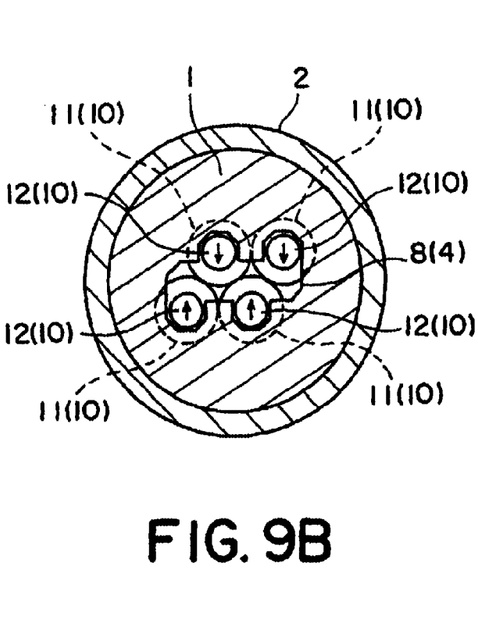
Figure 9C:
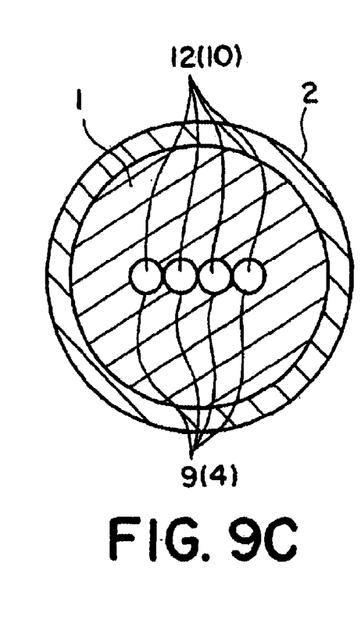

FIG. 9A shows the sectional configuration of the introductory hole 7 constituting the fiber insertion hole 4, FIG. 9B shows the sectional configuration of the intermediate hole 8, and FIG. 9C shows the sectional configuration of the minute holes 9.

The introductory hole 7 shown in FIG. 9A has a sectional configuration and a sectional area which allows simultaneous insertion of the coated portions 11 of a plurality of optical fibers 10 in a state in which two optical fibers 10 are arranged in parallel, with another two optical fibers being superimposed thereon. The lower two optical fibers 10 and the upper two optical fibers 10 are shifted from each other by the radius of the optical fibers 10.

The intermediate hole 8 shown in FIG. 9B has a sectional configuration and a sectional area which do not allow insertion of the coated portions 11 of the four optical fibers 10 bundled up as described above but which allow insertion of the bare fibers 12 in front of the coated portions 11.

FIG. 9C shows four minute holes 9 arranged in a lateral line. These four minute holes 9 are in close contact with or adjacent to each other at very small intervals.

FIGS. 9A through 9C only show an example of the sectional configuration of the fiber insertion hole 4. Even in the case of a fiber insertion hole 4 of a sectional configuration other than that shown in these drawings, it is possible to insert the four bare fibers 12 into the minute holes 9 arranged in a lateral line.

Figure 10A:
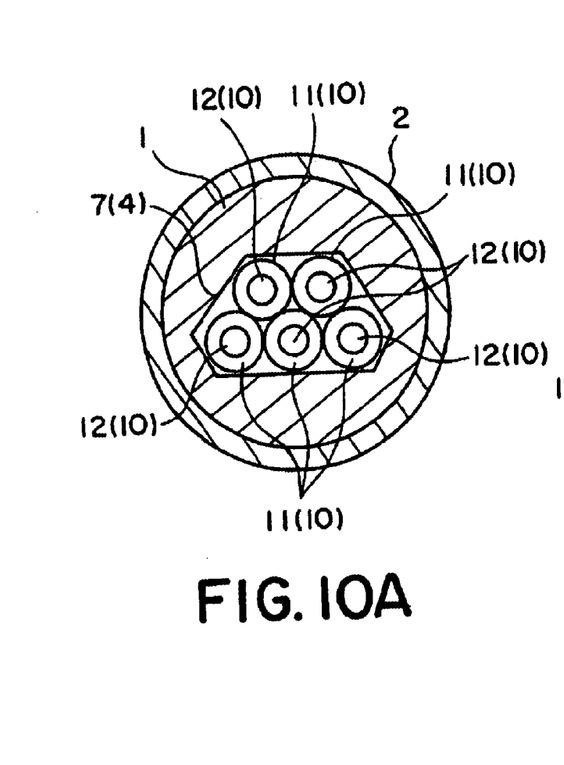
FIGS. 10A to 10C are sectional views showing another example of an optical connector ferrule according to the present invention.
Figure 10B:
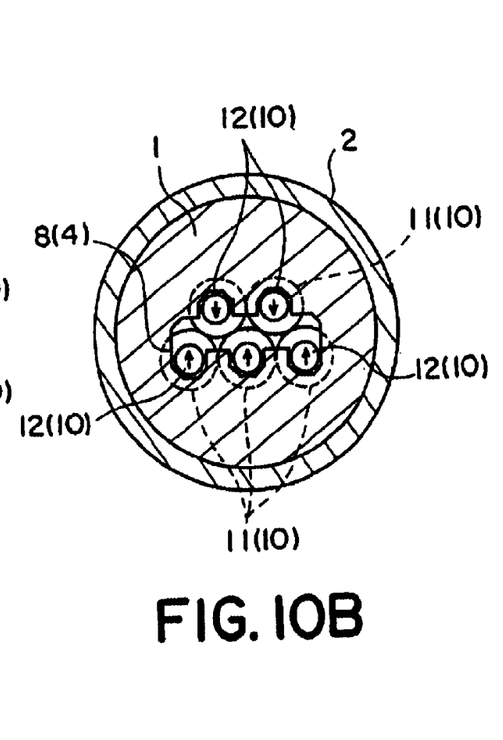
Figure 10C:
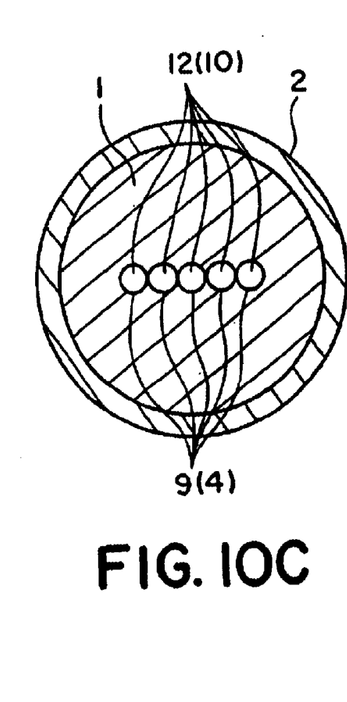

When inserting five bare fibers into five minute holes arranged in a lateral row, it is desirable the sectional configuration of the fiber insertion hole to be as shown in FIGS. 10A through 10C.

FIG. 10A shows the sectional configuration of the introductory hole 7 constituting the fiber insertion hole 4, FIG. 10B shows the sectional configuration of the intermediate hole 8, and FIG. 10C shows the sectional configuration of the minute holes 9.

The introductory hole 7 shown in FIG. 10A has a sectional configuration and a sectional area which allows simultaneous insertion of the coated portions 11 of the optical fibers 10 in a state in which three optical fibers 10 are arranged in parallel, with two other optical fibers 10 being superimposed thereon.

The intermediate hole 8 shown in FIG. 10B has a sectional configuration and a sectional area which do not allow insertion of the coated portions 11 of the five optical fibers 10 bundled up as described above but which allow insertion of the bare fibers 12 in front of the coated portions 11.

The five minute holes 9 shown in FIG. 10C are arranged in a lateral row. These five minute holes 9 are in close contact with or adjacent to each other at very small intervals.

FIGS. 10A through 10C only show an example of the sectional configuration of the fiber insertion hole 4. Even in the case of a fiber insertion hole 4 having a sectional configuration other than that shown in these drawings, it is possible to insert the five bare fibers 12 into the minute hole 9 arranged in a lateral row.

When inserting three or more bare fibers into minute holes arranged in a lateral row, the bending generated in the bare fibers before and after the insertion into the minute holes is smaller in the case in which the bare fibers are superimposed one upon the other than in the case in which they are arranged in a lateral row. Table 1 shows the results of an experiment performed in order to confirm the fact.

TABLE 1

| | Disposition of optical elements | |
|---|---|---|
| n (Number of optical fiber elements) | Deviation In a lateral row (FIG. 7) 125 um/2 × (n − 1) = (the amount of the deviation of an end optical fiber element in an arranged direction) | Deviation in two close stages (FIG. 8~10) $\sqrt{125^2 - 62.5^2}$ um = (the amount of the deviation of an arbitrary optical fiber element) |
| 2 | 62.5 μm | 108.3 μm |
| 3 | 125.0 μm | 108.3 μm |
| 4 | 187.5 μm | 108.3 μm |
| 5 | 250.0 μm | 108.3 μm |
| 6 | 312.5 μm | 108.3 μm |

* When there are three or more optical fiber elements, the deviation of optical fiber elements arranged in two or more stages is smaller than that of optical fiber elements arranged in a lateral row.

(Embodiment 5)

Figure 11:
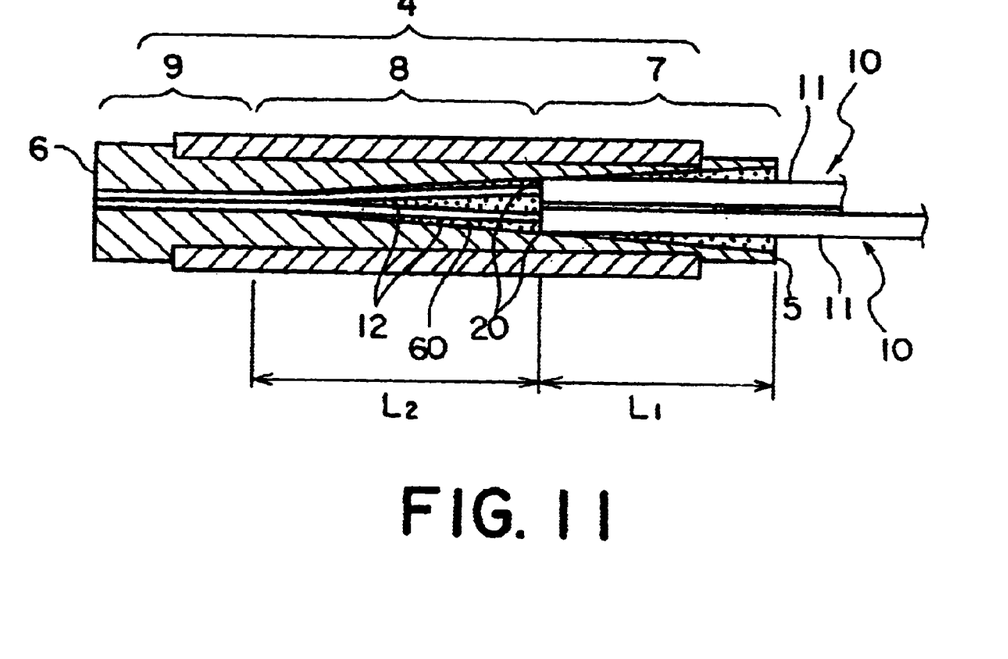
FIG. 11 is a sectional view showing another example of an optical connector ferrule according to the present invention.

An optical connector ferrule according to another embodiment of the present invention will be described with reference FIG. 11. The basic construction of the optical connector ferrule of this embodiment is the same as that of Embodiment 1. The difference lies in the fact that the sectional area of the fiber insertion hole 4 gradually diminishes from one end surface 5 side of the molded-plastic member 1 toward the ferrule end face 6 side. Thus, the forward end surfaces 20 (the pared sides 20 left after removing the coating to expose the bare fibers 12) of the coated portions 11 of the optical fibers 10 inserted into the fiber insertion hole 4 from the introductory hole 7 side are not allowed to be inserted beyond a predetermined longitudinal position (the inlet of the intermediate hole 8) of the fiber insertion hole 4. This is because the forward end surfaces 20 abut and are caught by the inner peripheral surface of the fiber insertion hole 4 (the inner peripheral surface of the inlet of the intermediate hole 8). Thus, by setting the length $L_1$ of the introductory hole 7 and the length $L_2$ of the intermediate hole 8 to be the same as those of Embodiment 1, it is possible to achieve the same effect as that of the optical connector ferrule of Embodiment 1.

The optical connector ferrule of the present invention described above is produced as follows. The metallic sleeve is arranged inside a mold, and a molding pin for forming the fiber insertion hole is arranged inside the metallic sleeve. Thereafter, molten resin is poured into the mold to form the molded-plastic member 1 in the metallic sleeve. The molding pin and the metallic sleeve arranged inside the mold are held at predetermined positions by a holding portion.

Alternatively, only the molded-plastic member is produced by resin molding, and this molded-plastic member is forcedly inserted into a metallic sleeve whose dimensional accuracy and configuration accuracy are both satisfactory. The producing method is not restricted to these two methods. Production is also possible by other methods.

The material of the molded-plastic member is not restricted to any specific resin. It is possible to use a desired resin according to the use of the optical connector using the optical connector ferrule of the present invention. For example, when using the optical connector connection to a semiconductor element, the metallic sleeve is fixed to a predetermined fixing portion by YAG welding or the like. Thus, an engineering plastic having high heat resistance is suitable as the material of the molded-plastic member. The material of the metallic sleeve is not restricted to any specific material, either. Preferred examples of the material include stainless steel, SF20T, covar, tungsten, aluminium, copper, and copper tungsten.

By making the inner diameter of the minute holes substantially the same as the diameter of the bare fibers inserted into them, it is possible to effectively prevent twisting and meandering of the bare fibers inside the minute holes. For example, when the diameter of the bare fibers is 0.125 mm, it is desirable for the inner diameter of the minute holes to be 0.126 mm. When the inner diameter of the minute holes is 0.126 mm, it is desirable for the pitch of the adjacent minute holes to be 0.126 mm.

Figure 12A:
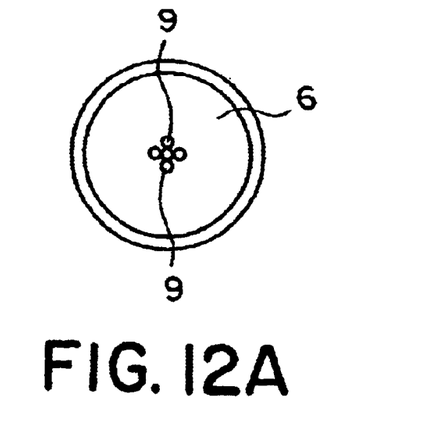
FIGS. 12A and 12B are end surface views showing another example of minute holes.
Figure 12B:
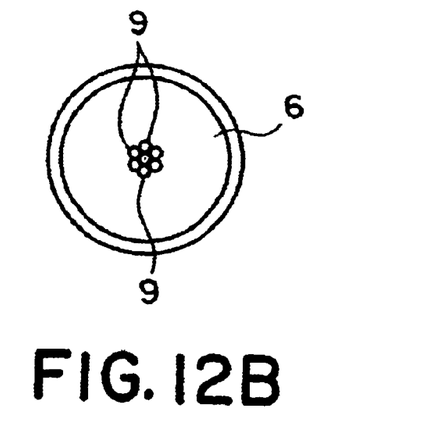

There is no particular restriction regarding the number of minute holes; it is possible to form a desired number of minute holes. There is no particular restriction regarding the arrangement of the plurality of minute holes, either. For example, it is possible, as shown in FIG. 12A, to form a minute hole 9 at the center of the molded-plastic member 1, forming four minute holes on a circumference whose center corresponds to the minute hole 9. Further, it is possible, as shown in FIG. 12B, to form a minute hole 9 at the center of the molded-plastic member 1, forming six minute holes on a circumference whose center corresponds to the minute hole 9. In either case, the arrangement pitch of the minute hole 9 can be arbitrarily determined. It may be an equal or unequal pitch.

There is no particular restriction regarding the sectional configurations and sectional areas of the introductory hole and the intermediate hole. The introductory portion may have any sectional configuration and sectional area as long as they allow simultaneous insertion of the coated portions of a plurality of optical fibers. The intermediate portion may have any sectional configuration and sectional area as long as they do not allow insertion of the coated portions of the optical fibers.

The optical connector ferrule of the present invention provides one or two or more of the following effects (1) through (3).

(1) The coated portions of the optical fibers inserted into the fiber insertion hole are not inserted beyond the intermediate hole. Thus, the insertion length of the coated portions in the fiber insertion hole is uniquely determined, so that there is no danger of the coated portions being inserted too deep into the fiber insertion hole or the insertion length being too short. As a result, the optical fibers are not easily broken even if a bending force is applied to the optical fibers inserted into the optical connector ferrule or there is a change in ambient temperature.

(2) The length of the introductory hole is not less than eight times the diameter of the coated portions of the optical fibers. Thus, the requisite insertion length of the coated portions in the fiber insertion hole is ensured, thus further reliably providing the above-mentioned effect.

(3) The intermediate hole has a predetermined length. More specifically, it has a length that does not cause the bare fibers to be bent by a bending radius not larger than a predetermined radius. Thus, the bare fibers are not easily broken.

What is claimed is:

1. An optical connector ferrule comprising:

a fiber insertion hole piercing from one end surface to the other end surface in a longitudinal direction, wherein said fiber insertion hole is composed of an introductory hole, an intermediate hole, and a plurality of minute holes, said introductory hole is formed on one end side in the longitudinal direction of said optical connector ferrule, said intermediate hole is formed in front of said introductory hole, said minute holes are formed in front of the intermediate hole, said introductory hole has a sectional area that allows insertion of a coated portion of an optical fiber, said intermediate hole has a sectional area which does not allow insertion of the coated portion of the optical fiber but which allows insertion of a bare fiber exposed at the forward end of the coated portion, said minute holes have a sectional area that allows insertion of the forward end portion of the bare fiber inserted into the intermediate hole; and wherein the length of the introductory hole is not less than eight times a diameter of a coated portion of the optical fiber.

2. An optical connector ferrule comprising:

a fiber insertion hole piercing from one end surface to the other end surface in a longitudinal direction, wherein said fiber insertion hole is composed of an introductory hole, an intermediate hole, and a plurality of minute holes, said introductory hole is formed on one end side in the longitudinal direction of said optical connector ferrule, said intermediate hole is formed in front of said introductory hole, said minute holes are formed in front of the intermediate hole, said introductory hole has a sectional area that allows insertion of a coated portion of an optical fiber, said intermediate hole has a sectional area which does not allow insertion of the coated portion of the optical fiber but which allows insertion of a bare fiber exposed at the forward end of the coated portion, said minute holes have a sectional area that allows insertion of the forward end portion of the bare fiber inserted into the intermediate hole, and wherein the sectional area of the introductory hole and the sectional area of the intermediate hole vary stepwise, and the length of the introductory hole is not less than eight times a diameter of a coated portion of the optical fiber.

3. An optical connector ferrule comprising a fiber insertion hole piercing from one end surface to the other end surface in a longitudinal direction:

wherein said fiber insertion hole is composed of an introductory hole, an intermediate hole, and a plurality of minute holes, said introductory hole is formed on one end side in the longitudinal direction of said optical connector ferrule, said intermediate hole is formed in front of said introductory hole, said minute holes are formed in front of the intermediate hole, said introductory hole has a sectional area that allows insertion of a coated portion of an optical fiber, said intermediate hole has a sectional area which does not allow insertion of the coated portion of the optical fiber but which allows insertion of a bare fiber exposed at the forward end of the coated portion, said minute holes have a sectional area that allows insertion of the forward end portion of the bare fiber inserted into the intermediate hole, and said intermediate hole has a length which does not involve bending of the optical fibers in the intermediate hole by a bending radius of not more than 10 mm when the forward ends of the optical fibers are inserted into the minute holes.

4. An optical connector ferrule comprising a fiber insertion hole piercing from one end surface to the other end surface in a longitudinal direction:

wherein said fiber insertion hole is composed of an introductory hole, an intermediate hole, and a plurality of minute holes, said introductory hole is formed on one end side in the longitudinal direction of said optical connector ferrule, said intermediate hole is formed in front of said introductory hole, said minute holes are formed in front of the intermediate hole, said introductory hole has a sectional area that allows simultaneous insertion of the coated portions of a plurality of optical fibers, said intermediate hole has a sectional area which does not allow simultaneous insertion of the coated portions of a plurality of optical fibers but which allows simultaneous insertion of bare fibers exposed at the forward end of the coated portions, each of said minute holes has a sectional area that allows individual insertion of each of the forward end portions of the bare fibers inserted into the intermediate hole, and said intermediate hole has a length which does not involve bending of the optical fibers in the intermediate hole by a bending radius of not more than 10 mm when the forward ends of the optical fibers are inserted into the minute holes.

5. An optical connector ferrule according to claim 3 or 4, wherein the sectional area of the introductory hole and the sectional area of the intermediate hole vary stepwise.

6. An optical connector ferrule according to claim 3 or 4, wherein the length of the introductory hole is not less than eight times the diameter of the coated portion of the optical fiber.

7. An optical connector ferrule according to claim 3 or 4:

wherein the sectional area of the introductory hole and the sectional area of the intermediate hole vary stepwise, and the length of the introductory hole is not less than eight times the diameter of the coated portion of the optical fiber.

* * * * *